United States Patent
Marlowe et al.

[15] 3,654,606
[45] Apr. 4, 1972

[54] ALTERNATING VOLTAGE EXCITATION OF LIQUID CRYSTAL DISPLAY MATRIX

[72] Inventors: Frank Jerome Marlowe, Kingston; Edward Oskar Nester, Hightstown, both of N.J.

[73] Assignee: RCA Corporation

[22] Filed: Nov. 6, 1969

[21] Appl. No.: 874,527

[52] U.S. Cl............................340/166, 350/160, 340/324
[51] Int. Cl.............................H04q 1/00, H04q 3/00
[58] Field of Search....................................340/166

[56] References Cited

UNITED STATES PATENTS

| | | | |
|---|---|---|---|
| 3,503,672 | 3/1970 | Marlowe | 350/160 |
| 3,503,673 | 3/1970 | Heilmeier et al. | 350/160 |
| 3,519,330 | 7/1970 | Heilmeier | 350/160 |
| 3,397,388 | 8/1968 | Abramson | 340/166 |
| 3,513,327 | 5/1970 | Johnson | 340/324 R |
| 3,522,473 | 8/1970 | Babb | 315/168 X |

Primary Examiner—Harold I. Pitts
Attorney—H. Christoffersen

[57] ABSTRACT

A unidirectional electric field is applied to selected liquid crystal elements of a display matrix during one display frame. The direction of application of the field is reversed during the next display frame. The above may be achieved, for example, by connecting a capacitor across the liquid crystal element, charging it in one sense during one frame then opening the charging circuit, and charging it in the opposite sense during the next frame and then opening the charging circuit.

8 Claims, 8 Drawing Figures

PATENTED APR 4 1972 3,654,606

INVENTORS
Frank J. Marlowe and
Edward O. Nester.
BY
ATTORNEY

INVENTORS
Frank J. Marlowe and
Edward O. Nester.
BY
ATTORNEY

ALTERNATING VOLTAGE EXCITATION OF LIQUID CRYSTAL DISPLAY MATRIX

BACKGROUND OF THE INVENTION

The article "Dynamic Scattering: A New Electrooptic Effect..." by G. H. Heilmeier, L. A. Zanoni, and L. A. Barton, *Proceedings of the IEEE*, Volume 56, No. 7, July, 1968, discusses nematic liquid crystals of a type of interest in the present application. As explained there, such crystals when in an unexcited state, are relatively transparent to light and when placed in an excited state by an applied electric field, scatter light. The light scattering, termed "dynamic scattering" is believed to result from turbulence developed in the crystal by ions in transit.

It is known that the operating life of a nematic liquid crystal can be increased many times by employing alternating voltage excitation rather than direct voltage excitation. However, attempts to employ this technique for a matrix of liquid crystal display elements have required more complex circuits at each row-column interconnection and more interconnecting buses than are needed with direct voltage excitation. Thus, efforts to achieve the advantages of alternating voltage excitation have led to an increase in manufacturing difficulty and a corresponding increase in production costs. In addition, because there are more control elements required, per matrix, there are lower fabrication yields and lower display element packing densities.

The object of the present invention is to provide an improved means for operating a liquid crystal display matrix providing the advantages of alternating voltage excitation, but without appreciably increasing the display matrix complexity or cost.

SUMMARY OF THE INVENTION

The matrices of the present invention include a display element at each location and means for selectively exciting said elements during successive frames. The last named means includes means providing paths for charging the elements in one sense during alternate frames and means providing paths for charging said elements in the opposite sense during the remaining frames.

DETAILED DESCRIPTION

Figure 1:
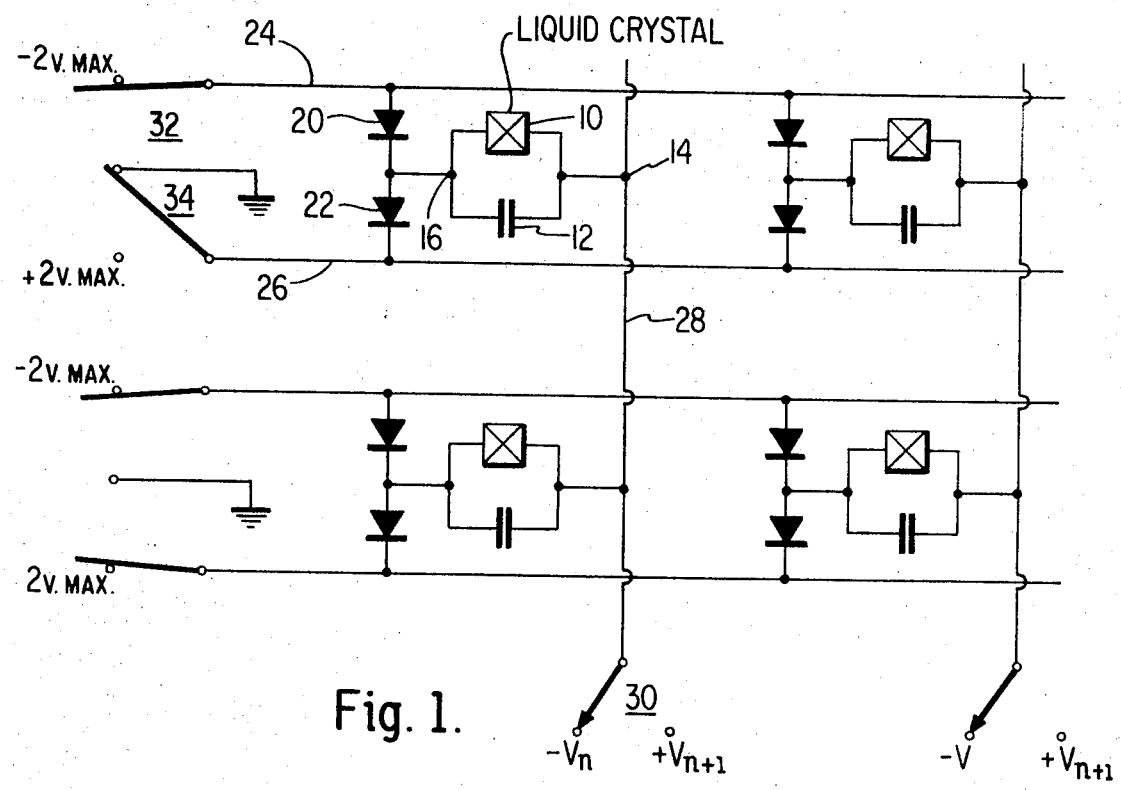
FIG. 1 is a schematic showing of one form of the present invention.

The display matrix of FIG. 1 comprises only four display element locations, however, it is to be understood that, in practice, there may be many more elements than this. The same holds for the form of the invention shown in FIG. 3.

The matrix of FIG. 1 includes, at each location, a liquid crystal element 10 and a capacitor 12 in shunt with the liquid crystal element. The parallel connected circuit 10, 12 is connected at one terminal 14 to a column lead 28 and its other terminal 16 to the anode-to-cathode connection of two diodes 20 and 22. Diode 20 is connected at its anode to one row lead 24 and diode 22 is connected at its cathode to a second row lead 26.

A column lead, such as 28, is placed at a voltage of $-v_{\cdot n}$ or $+v_{\cdot n+1}$ where $-v_{\cdot n}$ is the video level to which the element is to be charged during one frame and $+v_{\cdot n+1}$ is the video level to which that same element is to be charged during the next frame. The actual value of the voltage $-v_{\cdot n}$ may vary or not from column to column, depending on the brightness level to be represented at the respective column row intersections and is in the range from 0 to some maximum value $-v_{\cdot max}$ which may be $-30$ to $-40$ volts or so. Similarly, $+v_{\cdot n+1}$ is in the range from zero to $+30$ to $+40$ volts or so.

The means for connecting column 28 to the sources providing the respective voltages is shown as a mechanical switch 30, however, it is to be understood that, in practice, electronic means such as transistors or the like, are employed instead.

The upper row lead of each pair of row leads may be connected either to a $-2\,v_{\cdot max}$ source or to ground, that is, to 0 volts. The lower row lead of each pair may be connected either to 0 volts or to $+2\,v_{\cdot max}$. As in the case of the column conductors, the means for connecting the upper and lower rows are shown as mechanical switches 32 and 34, however, in practice, they are electronic switches such as transistors or the like.

Figure 2A:
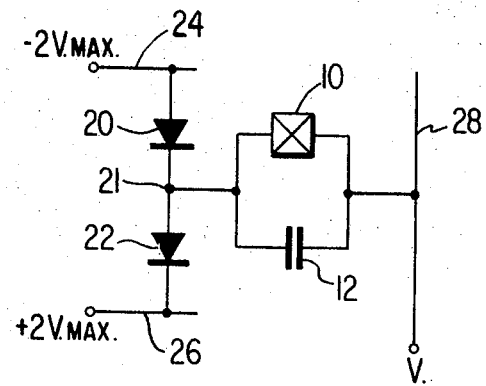
FIGS. 2a–2f are drawings to explain how the circuit of FIG. 1 operates.

The operation of the display will be discussed in connection with FIGS. 2a through 2f. FIG. 2a, which represents the major part of one frame time, shows the column lead 28 connected to v; the row lead 24 connected to $-2\,v_{\cdot max}$ and the row lead 26 connected to $+2\,v_{max}$. So connected, the two diodes 20 and 22 are back-biased and no voltage difference exists across the circuit 10, 12. If, as assumed for purposes of the present discussion, the capacitor initially is uncharged (this assumes that v. had the value 0, the last time the liquid crystal element shown was selected) it will remain uncharged. The bias voltages $\pm 2\,v_{\cdot max}$ are sufficient to insure that the diodes remain cut off while the other rows of the matrix are being addressed. (In the worst case, the common connection 21 of a nonselected element may assume some voltage equal to the column voltage $\pm v_{\cdot max}$ plus the largest voltage $\pm v_{\cdot max}$ stored in a capacitor. It is for this reason that the diodes are backbiased to the extent of $\pm 2\,v_{\cdot max}$).

Figure 2B:
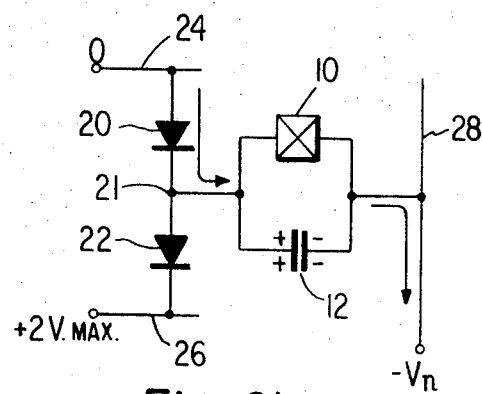

FIG. 2b represents the interval during the next frame during which the element is set to the voltage for that frame. In a television display organized on a line at a time basis, FIG. 2b may represent one line time, that is, roughly one-five hundreth of a frame time. The switches are actuated to apply 0 volts to row lead 24, $+2\,v_{\cdot max}$ to row lead 26 and $-v_{\cdot n}$ volts to column lead 28. The result is that diode 22 remains back-biased and diode 20 becomes forward biased. Current now flows through the diode 20 and the shunt circuit 10, 12 to the source for the negative voltage $-v_n$. The capacitor becomes charged in the polarity shown and the voltage which thereby develops across the capacitor and liquid crystal element 10 is sufficient to excite the liquid crystal. The response time of the liquid crystal is such that it does not scatter light at maximum intensity until 2 or 3 milliseconds after the application of the exciting voltage.

Figure 2C:
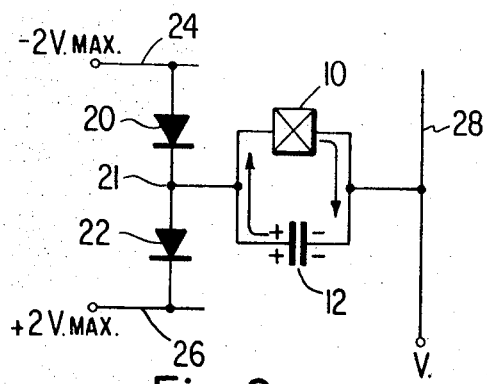

During the remainder of the frame, the row switching voltages are returned to their initial values as shown in FIG. 2c. In other words, $-2\,v_{\cdot max}$ is applied to row lead 24 and $+2\,v_{\cdot max}$ is applied to row lead 26. The column lead 28 is at some varying value, shown as V, which is a function of the brightness level represented by the video signal applied to the remaining elements of that column as the successive rows are addressed during the frame. The polarity of v. may be negative during the scan lines in the picture following the line containing the element shown in FIG. 2b and may then switch to positive for the scan lines in the picture from scan line 1 to the line containing the element shown in FIG. 2b. (Other alternative polarity reversing sequences also are possible.) Because the column lead can vary between limits $\pm v_{\cdot max}$, lead 24 is maintained at $-2\,v_{\cdot max}$ during this entire interval, that is, it is kept sufficiently negative to prevent conduction of charge via external circuits to or from the capacitor and lead 26 is maintained at $+2\,v_{\cdot max}$, also to prevent charge or discharge of the capacitor through external circuits.

With the voltage conditions as stated above, diodes 20 and 22 are back-biased so that the capacitor 12 is unable to discharge through either diode. The capacitor 12 therefore attempts to discharge through the liquid crystal element 10. Since the latter is of relatively high impedance, the capacitor maintains a voltage across the liquid crystal element of sufficient amplitude to keep the liquid crystal element in its excited that is, in its light scattering condition.

Figure 2D:
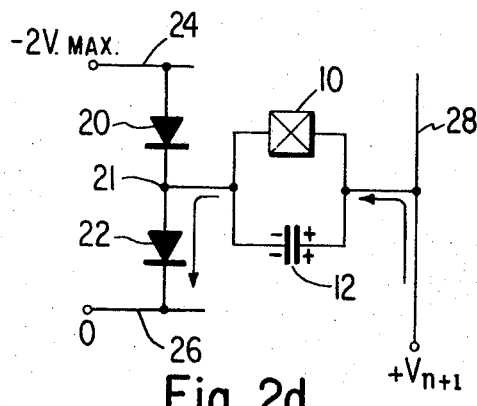

FIG. 2d represents the circuit condition during the line time of the next frame when the same element again is selected. A voltage of $-2 v._{max}$ is applied to the row lead 24; row lead 26 is placed at ground potential; and column lead 28 is at a voltage of $+v._{n+1}$. Under this set of conditions, diode 22 becomes forward biased (diode 20 remains back-biased) and current flows from the source of voltage $+v._{n+1}$ through the shunt circuit 10, 12 and through diode 22 to ground. The voltage is of sufficient amplitude to charge the capacitor 12 sufficiently to excite the liquid crystal 10, but it is of opposite polarity to the voltage applied to the liquid crystal during the previous frame, as shown in FIGS. 2c and 2b.

Figure 2E:
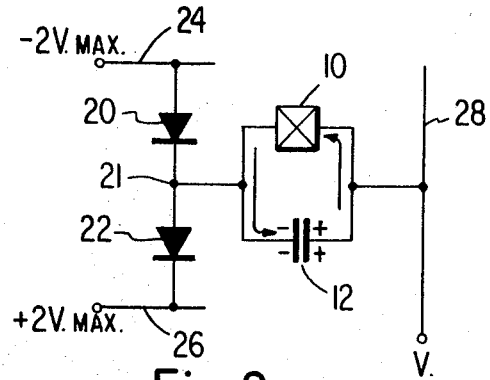

FIG. 2e shows what occurs during the remainder of the $n + 1$'th frame. Again, the circuit is switched to its original condition in which both diodes 20 and 22 are cut off. The only discharge path available for the capacitor 12 therefore, is through the liquid crystal 10 and so the capacitor continues to excite the liquid crystal and the latter continues to scatter light.

Figure 2F:
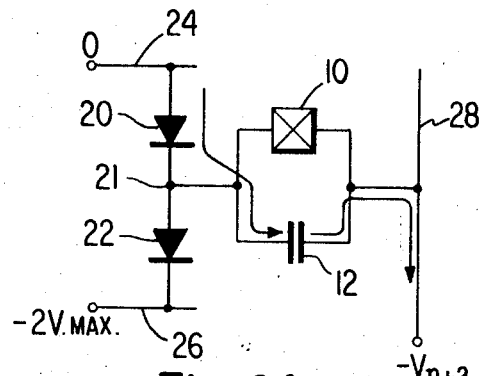

FIG. 2f represents the circuit condition during the line time in the next frame that is $(n + 2)$ frame, in which the same element again is addressed. It is assumed here that the level of the video signal $-v._{n+2}$ is 0 volts, which means that the liquid crystal element should become erased. The row lead 24 again is placed at 0 volts and the row lead 26 is again placed at $+2 v_{max}$. Under this set of conditions, the charge initially stored in the capacitor 12, of the polarity shown in FIG. 2e, quickly discharges through the diode 20, as shown by the arrows, and as both leads 24 and 28 are at the same voltage level, namely, 0 volts, no new charge is stored in the capacitor.

The matrix shown in FIG. 1 whose operation has just been explained, may be operated in bit organized or line organized fashion. Bit organization implies the selection of one display location at a time. In a bit organized display, when a line is turned on by setting that line to 0 volts, all but one diode in that row is held off by appropriate voltages applied to the columns containing the remaining diodes. In a line organized display, during the time it is desired to write into a row, the information to be displayed is applied to all columns concurrently. Thus, for example, the voltage applied to the selected row is as shown in FIG. 2b, the respective column leads would be placed at voltages indicative of the video level to be displayed at the respective column-row intersections. The remaining rows of the matrix would not be addressed. Each such remaining pair of row leads would be maintained at the voltages of $-2 v._{max}$ and $+2 v._{max}$, respectively, as shown in FIG. 2a, for example, to maintain all diodes in the non-selected rows back-biased.

Figure 3:
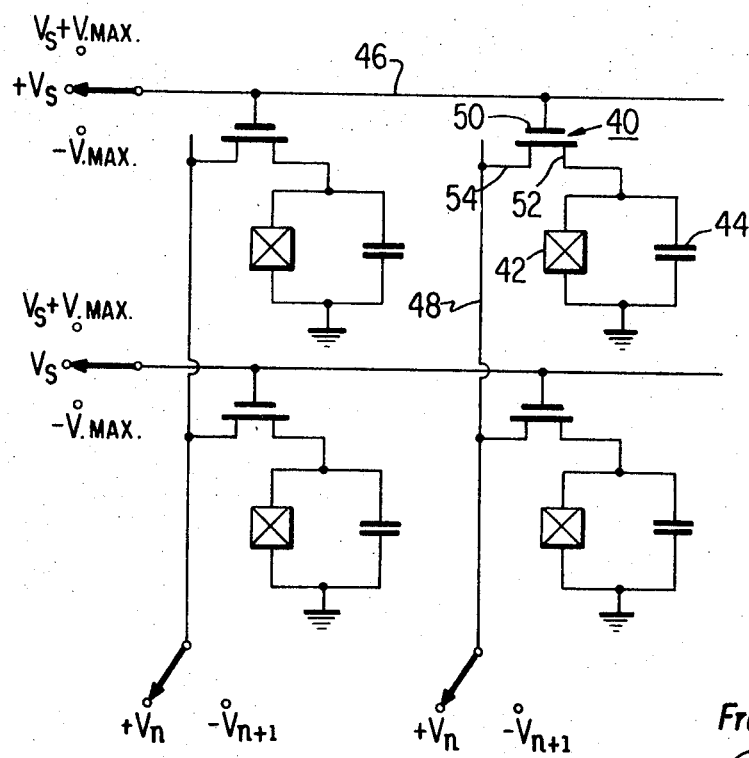
FIG. 3 is a schematic showing of another form of the present invention.

While there are several additional forms of the invention which are possible which operate on the same principle as the circuit of FIGS. 1 and 2, for purposes of the present application, only one other such circuit, shown in FIG. 3, is discussed. It includes, at each matrix location, an N-type, field-effect transistor (FET) 40, such as one of the metal oxide semiconductor (MOS) type, and a shunt circuit connected between one end of the conduction path of the transistor and ground. the FET is of the enhancement type and does not conduct between source and drain unless the gate voltage is $+v._s$ relative to the source. The shunt connected circuit is the same as the one of FIG. 1 and consists of a liquid crystal element 42 and capacitor 44. In the matrix of FIG. 3 there is one row lead, such as 46, and one column lead, such as 48, per matrix location. Each row lead may be connected to one of three different voltages $-v._{max}$, $+v._s$ or $v._s + v_{max}$. Each column lead may be connected to a video voltage, $+v._n$, or $-v._{n+1}$, where $v._n$ and $-v._{n+1}$ are the video voltage levels during the $n$'th and $n+1$'th rows, respectively.

In the operation of the matrix of FIG. 3, the field-effect transistor operates in one of three different ways. For one set of voltages, the field-effect transistor is cut off; for another set of voltages, the field-effect transistor conducts and acts as a source follower; for a third set of voltages, the field-effect transistor conducts and acts as a common source transistor.

When the gate electrode is placed at a voltage $v._{max} + v._s$ and the column such as 48, connected to that transistor is placed at a positive voltage $v._n$, where $0 \leq v._n \leq v._{max}$, the transistor operates as a source follower. In other words, electrode 52 acts as the source electrode, electrode 54 acts as the drain electrode, and current flows from the column conductor 48 through the conduction path of the transistor 40 and into the shunt connected circuit. The result is that a voltage of one polarity develops across the liquid crystal element and capacitor. The polarity is relatively positive, that is, the upper plate of capacitor 44 develops a relatively positive charge. Note that with the gate electrode held at a voltage $+v._{max} + v._s$, it is at least $v._s$ greater than the source voltage for any value of column voltage between 0 and $+v._{max}$ volts. Thus, the transistor conducts for any video signal, $v._n$ on the column buss.

When the column conductor 48 is placed at a relatively negative voltage $-v._n$, where $-v._{max} \leq -v._n \leq 0$ and the row conductor 46 is placed at a relatively positive voltage $+v._s$, transistor 40 operates as a drain follower. In other words, electrode 54 acts as the source electrode, electrode 52 as the drain electrode and the load 42, 44 is connected to the drain electrode. Now, current flows from ground through the shunt circuit 42, 44 and through the conduction path of the transistor to the negative voltage source $-v_n$. The result is a charge across the capacitor and the liquid crystal element of opposite polarity to that present in the previous frame. In other words, the upper plate of the capacitor appears to be relatively negative with respect to ground and a relatively negative voltage develops across the liquid crystal element. Note that with $v._{gate} = v._s$, the gate voltage is at least $+v._s$ greater than the source for a column voltage anywhere between $-v._{max}$ and 0, so the transistor conducts no matter what video signal is present on the column lead.

The operation of one display location of the matrix of FIG. 3 during successive frame is illustrated in the table below, where $\phi$ in the table represents "don't care":

| Row | Column | Transistor | Frame |
|---|---|---|---|
| $-V_{max}$ | $\phi$ | Off | |
| $+V_{max}+V_s$ | $+V_n$ | On source follower | n |
| $-V_{max}$ | $\phi$ | Off | |
| $+V_s$ | $-V_{n+1}$ | On drain follower | (n+1) |
| $-V_{max}$ | $\phi$ | Off | |
| $+V_{max}+V_s$ | $+V_{n+2}$ | On source follower | n+2 |
| $-V_{max}$ | $\phi$ | Off | |

It may be observed from the table that during the first part (such as one line time) of the $n$'th frame, the transistor is turned on, the capacitor becomes charged, and it applies voltage to the liquid crystal element at a level sufficient to excite it and cause it to scatter light to the extent called for by the video signal. In this circuit as in the FIG. 1 circuit, the liquid crystal response time is such that it does not exhibit the level of light scattering called for until 2 or 3 milliseconds after the start of the application of the exciting voltage. During the remainder of the $n$'th frame, the transistor is cut off, and the liquid crystal remains in its light scattering condition. Just as in the case of the embodiment of FIGS. 1 and 2, the capacitor continues to excite the liquid crystal as it cannot discharge through the field-effect transistor.

During the same line time of the $n + 1$'th frame, the field-effect transistor is turned on again, however, now the voltage polarities are such as to charge the capacitor and liquid crystal in the opposite polarity. The voltage developed across the crystal, while of opposite polarity to that developed in the first frame, is sufficient to maintain the liquid crystal in its excited condition.

During the remainder of the $n + 1$'st frame, the transistor is turned off but the liquid crystal remains in its excited state because the capacitor continues to retain its charge.

The remainder of the table is self explanatory.

While FIG. 3 illustrates the invention in terms of N-type, field-effect transistors, it is to be appreciated that with suitable changes in control voltages, P-type devices may be used instead. It is also to be appreciated that other forms of switching elements may be used at each display location without departing from the spirit of the invention.

An important feature of the present invention is its simplicity. For example, the diode matrix shown in FIG. 1 is no more complicated than a corresponding matrix which is operated by direct voltage rather than alternating voltage. For direct voltage excitation, each element must be reset to 0 volts before being addressed. Thus, direct voltage excitation requires special timing provisions and drivers to perform the reset at the end of each frame. In the present arrangement in which alternating voltage excitation is employed no reset operation is needed. Instead, the charge polarity is completely reversed each frame, automatically erasing the past history of the charge from the previous frame. Of course, alternating voltage excitation as described in the present application, both in the case of FIGS. 1 and 3, requires positive and negative voltage column drivers. This complication is offset however, by eliminating the need for a separate reset circuit.

For the field-effect transistor matrix shown in FIG. 3, the system requirements are slightly more complicated than those for direct voltage driven matrices, as negative and positive column drivers are needed. Nevertheless, the number of elements in the matrix remains unchanged. As a matter of fact, the excitation method of the present invention can be substituted for any comparable direct voltage excitation circuit with reset capability with no increase in matrix complexity. This is an important advantage. The only change needed in the matrix is that the isolation elements such as the diodes of FIG. 1 or the field-effect transistors of FIG. 3 must withstand higher off state voltages for alternating voltage excitation than for direct voltage excitation.

The term "frame" used in the discussion above is intended to be understood in a generic sense. The present invention is applicable to the case in which there is one field per frame or more than one field per frame. It is common to employ the latter, for example, in television where there are two interlaced fields per frame. In accordance with the teachings of the present invention, the voltage across a liquid crystal display element may be changed each field (even if there is more than one field per frame) or each frame (even in the case where there are two or more fields per frame). In the claims which follow the term "frame" is employed in the generic sense, that is, it is intended to describe both cases above.

What is claimed is:

1. In a display system in which each display element is addressed once each frame period, in combination:
   a matrix of display elements, each including an electrical charge storage means; and
   means for selectively exciting said elements during successive of said frame periods, said means including means for charging only in one sense the charge storage means of selected of said elements during each alternate frame period and means for charging only in the opposite sense the charge storage means of said selected elements during each remaining frame period.

2. In the combination set forth in claim 6, said display elements comprising nematic liquid crystal display elements of the type exhibiting dynamic scattering.

3. In the combination as set forth in claim 6, said matrix including, at each location, two diodes connected in series anode-to-cathode and a liquid crystal display element connected at one terminal to the anode-to-cathode connection of said diodes, and said means for selectively exciting comprising means for applying charge in one direction through one diode to said liquid crystal element during a portion of alternate frames and means for applying charge in the opposite direction through the other diode to said liquid crystal element during one portion of the remaining frames, in both cases for causing light-scattering to occur.

4. In the combination as set forth in claim 3, said matrix display including, at each location, a charge storage element connected across the liquid crystal element of that location, and further including means for maintaining both diodes cut-off between said one portion of one frame and said one portion of the following frame.

5. In the combination as set forth in claim 6, said matrix including, at each location, a field-effect transistor having a conduction path and a liquid crystal element in series with said path, and said means for selectively exciting comprising means for applying a charge through said conduction path to said liquid crystal element in one polarity during alternate frames for causing the liquid crystal element to scatter light and means for applying a charge through said conduction path to said liquid crystal element in the opposite polarity during the remaining frames for causing the liquid crystal element to scatter light.

6. In combination:
   a matrix of liquid crystal display elements; and
   means for selectively exciting said elements during successive frames, said means including means for charging only in one sense selected of said elements during each alternate frame and means for charging only in the opposite sense said selected elements during each remaining frame.

7. In a display system as set forth in claim 1, said means for selectively exciting said elements during successive of said frame periods including means for charging the charge storage means of selected elements to a given extent in one sense during each alternate frame period and means for charging the charge storage means of selected elements to the same extent in the opposite sense during each remaining frame period.

8. In the combination as set forth in claim 7, said means for selectively exciting said elements comprising means for charging them to the same extent in one sense as in the opposite sense.

* * * * *